United States Patent
Ranta-Aho et al.

(10) Patent No.: US 7,751,382 B2
(45) Date of Patent: Jul. 6, 2010

(54) POWER FOR UPLINK ACKNOWLEDGMENT TRANSMISSION

(75) Inventors: Karri Ranta-Aho, Espoo (FI); Masatoshi Nakamata, Kanagawa (JP); Jorma Kaikkonen, Oulu (FI)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 11/880,088

(22) Filed: Jul. 18, 2007

(65) Prior Publication Data

US 2009/0073904 A1 Mar. 19, 2009

Related U.S. Application Data

(60) Provisional application No. 60/879,694, filed on Jan. 9, 2007.

(51) Int. Cl.
*H04J 3/00* (2006.01)
(52) U.S. Cl. .................. 370/345; 370/349; 370/328; 455/550.1; 714/749
(58) Field of Classification Search .............. 370/349, 370/328, 345; 455/550.1; 714/749
See application file for complete search history.

(56) References Cited

U.S. PATENT DOCUMENTS

| 2003/0043778 | A1* | 3/2003 | Luschi et al. ............... 370/349 |
| 2004/0143676 | A1* | 7/2004 | Baudry et al. ............... 709/237 |
| 2006/0046655 | A1* | 3/2006 | Terashima .................. 455/41.2 |
| 2006/0123093 | A1* | 6/2006 | Kawamura ................... 709/206 |
| 2007/0060167 | A1* | 3/2007 | Damnjanovic et al. ...... 455/450 |
| 2007/0150788 | A1* | 6/2007 | Zhuyan ...................... 714/749 |

OTHER PUBLICATIONS

3GPP TS 25.213 3$^{rd}$ Generation Partnership; Technical Specification Group Radio Access Network; Spreading and modulation (FDD) (Release 6) V6.5.0, Mar. 2006.
3GPP TSG-RAN WG1 Meeting #47 Riga, Latvia, Nov. 6-10, 206.
3GPP TS 25.214 3$^{rd}$ Generation Partnership Project; Technical Specification Group Radio Access Network; Physical layer procedures (FDD) (Release 5) V.5.11.0, Jun. 2005.
3GPP TSG-RAN WG1 #46; R1-062031; Aug. 28-Sep. 1, 2006.
3GPP TSG-RAN WG1 #46, R1-062440, Aug. 28-Sep. 1, 2006.
3GPP TSG-RAN1 Meeting #46bis; Seoul, Korea, Oct. 9-13, 2006, vol 4.6.0.
3GPP TSG-RAN WG1 Meeting #47; R1-063581; Riga, Latvia, Nov. 6-10, 2006, vol. 7.2.0.
3GPP TSG-RAN Meeting #47bis; R1-070180; Jan. 15-19, 2007; Sorrento, Italy.

* cited by examiner

*Primary Examiner*—Danh C Le

(57) ABSTRACT

The specification and drawings present a new method, system, apparatus and software product for defining/setting a power of a dual acknowledgement signal provided in an uplink by a user equipment to a network element (e.g., Node B) for acknowledging two transport blocks, e.g., comprised in one TTI, transmitted in a downlink by the network element, according to a predetermined criterion, wherein the user equipment and the network element can be configured to support a multiple input multiple output (MIMO) mode and/ or a high speed downlink packet access.

32 Claims, 2 Drawing Sheets

POWER FOR UPLINK ACKNOWLEDGMENT TRANSMISSION

PRIORITY AND CROSS-REFERENCE TO RELATED APPLICATION

This application claims priority from U.S. patent application Ser. No. 60/879,694, filed on Jan. 9, 2007.

TECHNICAL FIELD

This invention generally relates to communications, e.g., wireless communications, and more specifically to setting power for an uplink acknowledgment feedback transmission.

BACKGROUND ART

When the radio link is configured in MIMO (multiple input multiple output) mode, then the downlink may transmit either one or two transport blocks in a single TTI (transmission timing interval), e.g., in the downlink HSDPA (high speed downlink packet access). This decision can be made dynamically, e.g., by a Node B scheduler. When one transport block is sent in the downlink, then one ACK/NACK indication is sent back to the Node B by the UE (user equipment). When two transport blocks are sent in the downlink, then two ACK/NACK indications (one for each transport block) can be sent in the uplink as provided within a hybrid automatic request process (HARQ).

There is a basic agreement in 3GPP (3rd Generation Partnership Project) that the single and dual ACK/NACK transmissions are sent in the same bit-field, meaning that when a single ACK/NACK is sent, then there is only one information bit to be coded, e.g., in the ACK/NACK field of the HS-DPCCH (high speed dedicated physical transport channel), but when two ACK/NACK transmissions are sent, then there are two information bits to be coded in the ACK/NACK field effectively halving the transmitted energy per information bit. Typically, the Node B knows in advance based on the downlink transmission whether to expect one or two ACK/NACK transmissions. Setting the power levels of the single/dual ACK/NACK in such a fashion should provide a high reliability of the dual ACK/NACK, but minimize energy used for the single ACK/NACK. In earlier solutions (e.g., see section 5.1.2.5A of 3GPP TS25.214, "Physical layer procedures (FDD)", V5.11.0), an RNC (radio network controller), can signal, e.g., through the Node B to the UE, separate power offsets (levels) to be used for ACK and NACK transmissions ($\Delta$ACK and $\Delta$NACK respectively).

DISCLOSURE OF THE INVENTION

According to a first aspect of the invention, a method, comprises: receiving two transport blocks of information by a user equipment from a network element; defining by the user equipment a power of a dual acknowledgement signal for acknowledging the two transport blocks according to a predetermined criterion, wherein the power has an offset relative to a base power of a single acknowledgement signal for acknowledging one transport block of information when received by the user equipment from the network element; and transmitting the dual acknowledgement signal using the power by the user equipment to the network element.

According further to the first aspect of the invention, the base power may be an ACK power if, after being received, both the two transport blocks are successfully decoded by the user equipment, wherein the ACK power for the single acknowledgement signal corresponds to successfully decoding, when received, the one block by the user equipment.

Further according to the first aspect of the invention, the base power may be a NACK power if, after being received, one or two of the two transport blocks are unsuccessfully decoded by the user equipment, wherein the NACK power for the single acknowledgement signal corresponds to unsuccessfully decoding, when received, the one block by the user equipment.

According yet further to the first aspect of the invention, bit-field lengths of the dual acknowledgement signal and the single acknowledgement signal may be equal.

According still further to the first aspect of the invention, the offset or the base power may be provided by a network element or defined by a specification.

According further still to the first aspect of the invention, the dual acknowledgement signal and the single acknowledgement signal may be provided within a hybrid automatic request process.

According yet further still to the first aspect of the invention, the dual acknowledgement signal and the single acknowledgement signal may be transmitted on a high speed dedicated physical transport channel.

Yet still further according to the first aspect of the invention, the user equipment and the network element may be configured to support at least one of: a) a multiple input-multiple output mode and b) a high speed downlink packet access.

Still yet further according to the first aspect of the invention, at least one transmission timing interval of the downlink signal may comprise the two transport blocks.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by a component or a combination of components of the network element or the user equipment According to a third aspect of the invention, a user equipment, comprises: a receiving/transmitting/processing module, configured to receive from a network element and further forwarding a downlink signal comprising two transport blocks of information, configured to transmit a dual acknowledgement signal for acknowledging the two transport blocks to the network element; and an uplink scheduling and signal generating module, responsive to the two transport blocks of information comprised in the downlink signal, configured to define a power of the dual acknowledgement signal for acknowledging the two transport blocks according to a predetermined criterion, wherein the power has an offset relative to a base power of a single acknowledgement signal for acknowledging one transport block of information when received by the user equipment from the network element.

According further to the third aspect of the invention, the base power may be an ACK power if, after being received, both the two transport blocks are successfully decoded by the user equipment, wherein the ACK power for the single acknowledgement signal corresponds to successfully decoding, when received, the one block by the user equipment.

Further according to the third aspect of the invention, the base power may be a NACK power if, after being received, one or two of the two transport blocks are unsuccessfully decoded by the user equipment, wherein the NACK power for the single acknowledgement signal corresponds to unsuccessfully decoding, when received, the one block by the user equipment.

Still further according to the third aspect of the invention, bit-field lengths of the dual acknowledgement signal and the single acknowledgement signal may be equal.

According yet further to the third aspect of the invention, the offset or the base power may be provided by a network element.

According still further to the third aspect of the invention, the offset may be defined by a specification.

According yet further still to the third aspect of the invention, the dual acknowledgement signal and the single acknowledgement signal may be provided within a hybrid automatic request process.

According further still to the third aspect of the invention, the dual acknowledgement signal and the single acknowledgement signal may be transmitted on a high speed dedicated physical transport channel. Yet still further according to the third aspect of the invention, the user equipment may be configured to support at least one of: a multiple input-multiple output mode and a high speed downlink packet access.

Still yet further according to the third aspect of the invention, at least one transmission timing interval of the downlink signal may comprise the two transport blocks.

Still further still according to the third aspect of the invention, the power may be two times the base power.

Still yet further still according to the third aspect of the invention, an integrated circuit may comprise the uplink scheduling and signal generating module and the receiving/transmitting/processing module.

According to a fourth aspect of the invention, a communication system, comprises: a network element, configured to provide a downlink signal comprising two transport blocks of information, configured to receive a dual acknowledgement signal for acknowledging the two transport blocks; and a user equipment, configured to receive and further forward a downlink signal comprising the transport blocks of information, configured to provide the dual acknowledgement signal for acknowledging the two transport blocks, configured to define a power of the dual acknowledgement signal for acknowledging the two transport blocks according to a predetermined criterion, wherein the power has an offset relative to a base power of a single acknowledgement signal for acknowledging one transport block of information when received by the user equipment from the network element.

According further to the fourth aspect of the invention, the base power may be an ACK power if, after being received, both the two transport blocks are successfully decoded by the user equipment, wherein the ACK power for the single acknowledgement signal corresponds to successfully decoding, when received, the one block by the user equipment.

Further according to the fourth aspect of the invention, the base power may be a NACK power if, after being received, one or two of the two transport blocks are unsuccessfully decoded by the user equipment, wherein the NACK power for the single acknowledgement signal corresponds to unsuccessfully decoding, when received, the one block by the user equipment.

According to a fifth aspect of the invention, a network element, comprises: an uplink power and scheduling module, configured to provide a downlink signal comprising two transport blocks of information, configured to define a power of a dual acknowledgement signal for acknowledging the two transport blocks by a user equipment according to a predetermined criterion, wherein the power has an offset relative to a base power of a single acknowledgement signal for acknowledging one transport block of information when received by the user equipment from the network element; and a receiver, configured to receive the dual acknowledgement signal for acknowledging the two transport blocks.

According further to the fifth aspect of the invention, the network element further comprises: a transmitter, configured to transmit a downlink signal comprising two transport blocks of information, and for transmitting a power instruction signal comprising the power offset to the user equipment.

According to a sixth aspect of the invention, a user equipment, comprises: means for transmitting and receiving, for receiving from a network element and further forwarding a downlink signal comprising two transport blocks of information, for transmitting a dual acknowledgement signal for acknowledging the two transport blocks to the network element; and means for signal managing, responsive to the two transport blocks of information comprised in the downlink signal, for defining a power of the dual acknowledgement signal for acknowledging the two transport blocks according to a predetermined criterion, wherein the power has an offset relative to a base power of a single acknowledgement signal for acknowledging one transport block of information when received by the user equipment from the network element.

According further still to the sixth aspect of the invention, the managing means may be an uplink scheduling and signal generating module.

According to a seventh aspect of the invention, a method, comprises: sending two transport blocks of information by a network element to a user equipment; defining by the network element a power of a dual acknowledgement signal for acknowledging the two transport blocks according to a predetermined criterion, wherein the power has an offset relative to a base power of a single acknowledgement signal for acknowledging one transport block of information when received by the user equipment from the network element; and receiving by the network element the dual acknowledgement signal using the power sent by the user equipment.

According further still to the seventh aspect of the invention, the network element may be a Node B configured for wireless communications.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
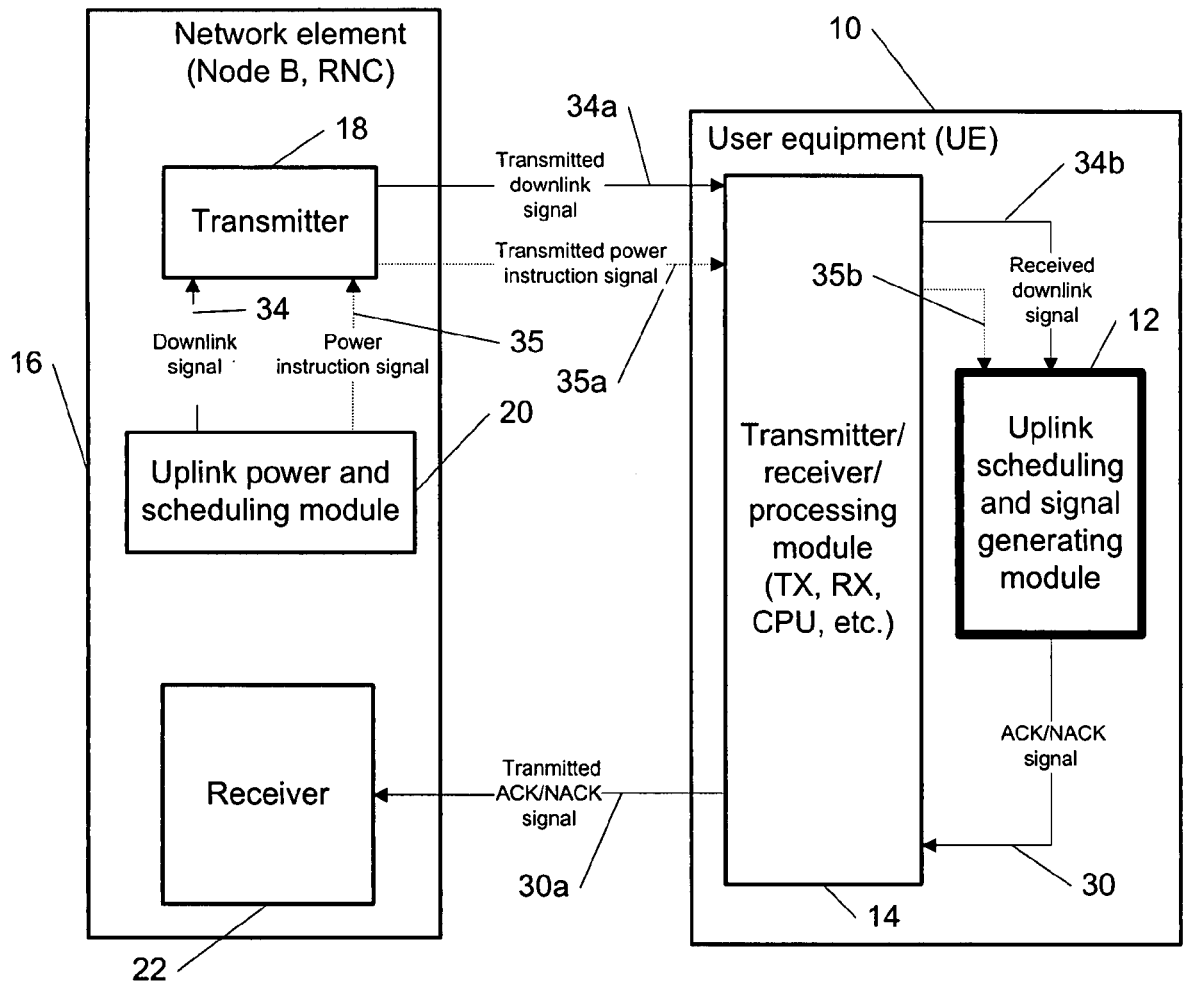
FIG. 1 is a block diagram demonstrating power setting for an uplink acknowledgment feedback transmission using a dual acknowledgement signal, according to embodiments of the present invention.

A new method, system, apparatus and software product are presented for defining/setting a power of a dual acknowledgement signal (or dual ACK/NACK) provided in an uplink (UL) by a user equipment (UE) to a network element (e.g., Node B) for acknowledging two transport blocks, e.g., comprised in one TTI (transmission timing interval), transmitted in a downlink (DL) by the network element, according to a predetermined criterion, wherein the user equipment and the network element can be configured to support a multiple input multiple output (MIMO) mode and/or a high speed downlink packet access (HSDPA).

According to one embodiment, this power of the dual acknowledgement signal can have an offset relative to a base power (e.g., $\Delta_{ACK}$ and $\Delta_{NACK}$ respectively) of a single acknowledgement signal (or a single ACK/NACK) for acknowledging one transport block of information (i.e., the TTI comprises only one transport block of information) when received by the user equipment from the network element. The dual acknowledgement signal and the single acknowledgement signal can be provided within a hybrid automatic request process (HARQ) and can be transmitted, e.g., on a high speed dedicated physical transport channel (HS-DPCCH).

According to another embodiment of the present invention, the base power can be defined as (or to be set to) an ACK power (or $\Delta_{ACK}$), if, after being received, both the two transport blocks are successfully decoded by the user equipment, wherein the ACK power for the single acknowledgement signal corresponds to successfully decoding, when received, one block (i.e., the TTI comprises only one transport block of information) by the user equipment. Moreover, according to a further embodiment, the base power can be defined as (or to be set to) a NACK power (or $\Delta_{NACK}$), if, after being received, one or both of the two transport blocks are unsuccessfully decoded by the user equipment, wherein the NACK power for the single acknowledgement signal corresponds to unsuccessfully decoding, when received, one block (i.e., the TTI comprises only one transport block of information) by the user equipment.

The rationale for the above base power allocation is based on a fact that NACK-to-ACK error is more critical than ACK-to-NACK error (an incorrectly received packet thought to be received correctly leads to a higher layer retransmission and to an increased delay while a correctly received packet thought to be received incorrectly leads to an unnecessary HARQ retransmissions), and, therefore, it is natural to base the transmission to $\Delta_{NACK}$ if one or both of the two ACK/NACKs being sent as NACK, and only base the transmission to $\Delta_{ACK}$ if both of the two ACK/NACKs being sent are ACK. Moreover, if a single ACK/NACK is sent (e.g., in case of one transport block in the TTI), then the transmission power should be based to $\Delta$NACK if NACK is sent and to $\Delta$ACK if ACK is sent as known in the art.

The different transmission power needs of the single ACK/NACK and the dual ACK/NACK can be handled using an additional power offset which is denoted $\Delta$dual. The $\Delta$dual could be signaled by the network element (e.g., originating from a radio network controller, RNC) to the UE or it could be fixed in a specification to a specific value. For example, using $\Delta$dual=3 dB can double the transmission power for the dual ACK/NACK while maintaining the same transmitted energy per information bit using the same bit-field lengths for the dual ACK/NACK and single ACK/NACK transmissions. The usage of an additional power offset $\Delta$dual with dual ACK/NACK transmission can compensate the fact that two bits of information are being sent in the same field that is also used for sending one bit of information, thus maintaining the optimal power level for the ACK/NACK field regardless of whether a single or dual ACK/NACK transmission is taking place.

The power offset selection table, e.g., for the HS-DPCCH ACK/NACK field in the MIMO mode could be formulated as shown in Table 1 below:

TABLE 1

The power offset selection table.

| Content of the ACK/NACK field of the HS-DPCCH | Power to be used in transmission |
| --- | --- |
| ACK | $\Delta_{ACK}$ |
| NACK | $\Delta_{NACK}$ |
| ACK + ACK | $\Delta_{ACK}$ + $\Delta$dual |
| ACK + NACK | $\Delta_{NACK}$ + $\Delta$dual |
| NACK + ACK | $\Delta_{NACK}$ + $\Delta$dual |
| NACK + NACK | $\Delta_{NACK}$ + $\Delta$dual |

One example among others of ACK/NACK bit-field content for the single and dual ACK/NACK transmissions, comprising, e.g., 10 bits in the MIMO mode, can be found in R1-063581, 25.212CR0242r3 (Rel-7, B) "Coding of HS-DPCCH to support operation of FDD MIMO", Qualcomm.

According to another example among others, the powers (power offsets) $\Delta_{ACK}/\Delta_{NACK}$ can be translated to a gain factor $A_{hs}$ for HS-DPCCH transmission according to Table 1A from 3GPP TS25.213, "Spreading and modulation (FDD)", V6.5.0 as shown below (the steps correspond to 2 dB steps in the transmission power) and can be provided to the network element. For example, the network (e.g., the network element) can signal an index number 0, . . . , or 8 which will map to a corresponding quantized amplitude ratio x/15, wherein x=5, 6, . . . , or 30, as shown in Table 1A. The offset $\Delta$dual is actually an offset to the index signalled by the network. For example, the UE can use ($\Delta$ACK index)=0,1, . . . or 8 to define the power of the single acknowledgement signal if the single ACK is being sent, or the UE can use ($\Delta$ACK index)+1 to define the power of the dual acknowledgement signal if the dual ACK/ACK is being sent (see Table 1), according to an embodiment of the present invention. Similarly, the UE can use ($\Delta$NACK index)+1 to define the power of the dual acknowledgement signal if the ACK/NACK, NACK/ACK or NACK/NACK is being sent (see Table 1).

TABLE 1A

The quantization of the power offset

| Signalled values for $\Delta_{ACK}$, $\Delta_{NACK}$ and $\Delta_{CQI}$ | Quantized amplitude ratios $A_{hs} = \beta_{hs}/\beta_c$ |
| --- | --- |
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

FIG. 1 shows an example among others of a block diagram demonstrating power setting for an uplink acknowledgment feedback transmission using a dual acknowledgement signal, according to embodiments of the present invention.

In the example of FIG. 1, a user equipment 10 comprises an uplink scheduling and signal generating module 12 and a transmitter/receiver/processing module 14. The module 12 can be generally viewed as means for signal managing or a structural equivalence (or an equivalent structure) thereof. Also, the module 14 can generally be means for transmitting and/or receiving, e.g., a transceiver, or a structural equivalence (or equivalent structure) thereof. The user equipment 10 can be a wireless device, a portable device, a mobile communication device, a mobile phone, etc. In the example of FIG. 1, a network element 16 (e.g., a node B or a radio network controller, RNC) can comprise a transmitter 18, an uplink power and scheduling block 20 and a receiver 22.

According to an embodiment of the present invention, the uplink power planning block 20 can provide a power instruction signal 35, comprising power setting for the single and dual ACK/NACK uplink transmission according to various embodiments described herein, which is then forwarded using signals 35a and 35b to the module 12. The module 20 can also provide a downlink signal 34, comprising, e.g., TTIs with two transport blocks, according to various embodiments described herein, which is then forwarded using signals 34a and 34b to the module 12. In response to the signal 34b and possibly using the power setting information comprised in the instruction signal 35b (e.g., if the dual offset is not set by the specification), the module 12 then can provide an ACK/NACK signal 30 comprising the dual acknowledgement signal according to various embodiments of the present invention described herein, which is then forwarded as a signal 30a to the receiver block 22 of the network element 16. In another embodiment of the present invention, the module 12 can define or partially define (i.e., without or with a partial input from the network element 16, if, e.g., the dual offset is set by the specification) the power for the dual acknowledgement signal comprised in the signal 30 and 30a.

According to an embodiment of the present invention, the module 12 (the same is applicable to the modules 20) can be implemented as a software or a hardware block or a combination thereof. Furthermore, the module 12 (as well as the module 20 and other modules) can be implemented as a separate block or can be combined with any other standard block or it can be split into several blocks according to their functionality. The transmitter/receiver/processing block 14 can be implemented in a plurality of ways and typically can include a transmitter, a receiver, a CPU (central processing unit), etc. The transmitter and receiver can be combined, for example, in one module such as transceiver, as known in the art. The module 14 provides an effective communication of the module 12 with the network element 16 as described herein. All or selected blocks and modules of the user equipment 10 can be implemented using an integrated circuit, and all or selected blocks of the network element 16 can be implemented using an integrated circuit as well.

It is noted that the network element 16, for the purposes of understanding of various embodiments of the present invention, can be broadly interpreted such that the network element 16 can comprise features attributed to both the Node B and the radio network controller (RNC). Specifically, the module 20 can be located in the RNC (then the signaling from the RNC is forwarded to the user equipment by the Node B) or in the Node B, whereas the block 22 is located in the Node B.

Figure 2:
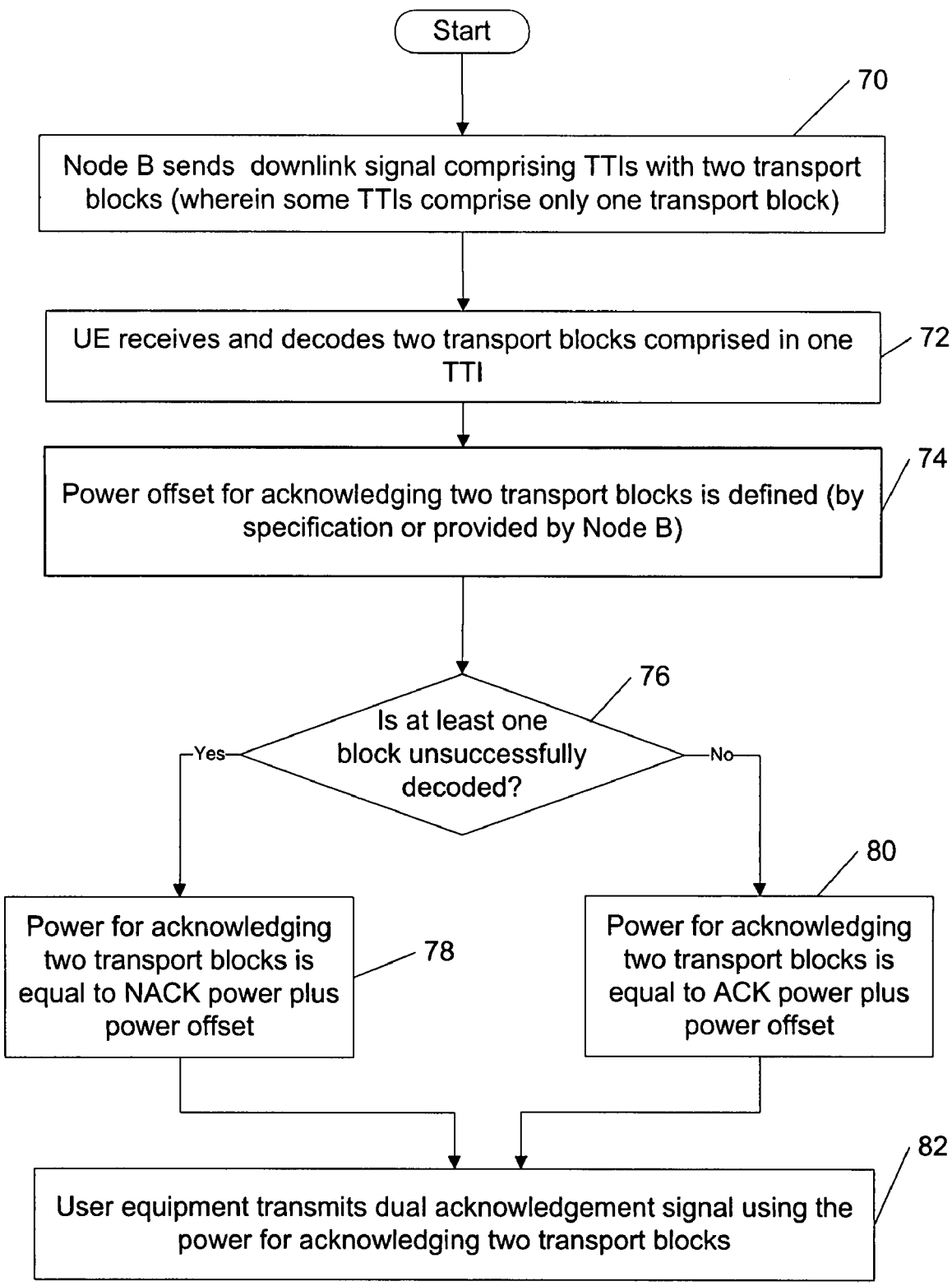
FIG. 2 is a flow chart demonstrating power setting for an uplink acknowledgment feedback transmission using a dual acknowledgement signal, according to embodiments of the present invention.

FIG. 2 shows an example of a flow chart demonstrating power setting for an uplink acknowledgment feedback transmission using a dual acknowledgement signal, according to embodiments of the present invention.

The flow chart of FIG. 2 only represents one possible scenario among others. The order of steps shown in FIG. 2 is not absolutely required, so generally, the various steps can be performed out of order. In a method according to an embodiment of the present invention, in a first step 70, the Node B sends downlink signal comprising TTIs with two transport blocks (wherein some TTIs in the downlink signal may comprise only one transport block). In a next step 72, the UE receives and decodes two transport blocks comprised in one TTI of the received TTIs.

It is noted that the UE typically knows whether the TTI contains one or two transport blocks based on the DL control channel (e.g., HS-SCCH, shared control physical channel for high speed downlink shared channel). If the HS-SCCH is lost then the UE considers this as no transmission and responds nothing. If the TTI is received by the UE and contains two transport blocks as in step 72, then it either responds NACK/NACK, NACK/ACK, ACK/NACK or ACK/ACK depending on the decoding success. Then in a next step 74, the power offset for acknowledging these two transport blocks is defined (by a specification or provided by the Node B).

In a next step 76, it is determined (as a logical step) whether at least one block (it could be one or both) of the two transport blocks are unsuccessfully decoded. If that is the case, then in step 78, the power for acknowledging the two transport blocks is set to be equal to NACK power ($\Delta_{NACK}$), as described herein, plus the power offset defined in step 74, and then the process goes to step 82. If, however, it is determined that both two transport blocks are successfully decoded, in a next step 80, the power for acknowledging the two transport blocks is set to be equal to ACK power ($\Delta_{ACK}$), as described herein, plus the power offset defined in step 74. Finally, in a next step 82, the user equipment transmits the dual acknowledgement signal using the power for acknowledging two transport blocks set in step 78 or 80.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
    receiving two transport blocks of information by a user equipment from a network element;
    defining by the user equipment a power of a dual acknowledgement signal for acknowledging said two transport blocks according to a predetermined criterion, wherein said power has an offset relative to a base power of a single acknowledgement signal for acknowledging one transport block of information when received by said user equipment from said network element; and
    transmitting said dual acknowledgement signal using said power by the user equipment to the network element.

2. The method of claim 1, wherein said base power is an ACK power if, after being received, both said two transport blocks are successfully decoded by the user equipment, wherein said ACK power for said single acknowledgement signal corresponds to successfully decoding, when received, said one block by the user equipment.

3. The method of claim 1, wherein said base power is a NACK power if, after being received, one or two of said two transport blocks are unsuccessfully decoded by the user equipment, wherein said NACK power for said single acknowledgement signal corresponds to unsuccessfully decoding, when received, said one block by the user equipment.

4. The method of claim 1, wherein bit-field lengths of said dual acknowledgement signal and said single acknowledgement signal are equal.

5. The method of claim 1, wherein said offset or said base power is received by the user equipment from the network element or defined by a specification.

6. The method of claim 1, wherein said dual acknowledgement signal and said single acknowledgement signal are provided within a hybrid automatic request process.

7. The method of claim 1, wherein said dual acknowledgement signal and said single acknowledgement signal are transmitted on a high speed dedicated physical transport channel.

8. The method of claim 1, wherein said user equipment and said network element are configured to support at least one of: a multiple input-multiple output mode and a high speed downlink packet access.

9. The method of claim 1, wherein at least one transmission timing interval of said downlink signal comprises said two transport blocks.

10. A computer program product comprising: a computer readable storage structure embodying computer program code thereon for execution by a computer processor with said computer program code, wherein said computer program code comprises instructions for performing the method of claim 1, indicated as being performed by a component or a combination of components of said network element or said user equipment.

11. A user equipment, comprising:
a receiving/transmitting/processing module, configured to receive from a network element and further forwarding a downlink signal comprising two transport blocks of information, configured to transmit a dual acknowledgement signal for acknowledging said two transport blocks to the network element; and
an uplink scheduling and signal generating module, responsive to said two transport blocks of information comprised in said downlink signal, configured to define a power of said dual acknowledgement signal for acknowledging said two transport blocks according to a predetermined criterion, wherein said power has an offset relative to a base power of a single acknowledgement signal for acknowledging one transport block of information when received by said user equipment from said network element.

12. The user equipment of claim 11, wherein said base power is an ACK power if, after being received, both said two transport blocks are successfully decoded by the user equipment, wherein said ACK power for said single acknowledgement signal corresponds to successfully decoding, when received, said one block by the user equipment.

13. The user equipment of claim 11, wherein said base power is a NACK power if, after being received, one or two of said two transport blocks are unsuccessfully decoded by the user equipment, wherein said NACK power for said single acknowledgement signal corresponds to unsuccessfully decoding, when received, said one block by the user equipment.

14. The user equipment of claim 11, wherein bit-field lengths of said dual acknowledgement signal and said single acknowledgement signal are equal.

15. The user equipment of claim 11, wherein said receiving/transmitting/processing module is configured to receive said offset or said base power from the network element.

16. The user equipment of claim 11, wherein said offset is defined by a specification.

17. The user equipment of claim 11, wherein said dual acknowledgement signal and said single acknowledgement signal are provided within a hybrid automatic request process.

18. The user equipment of claim 11, wherein said dual acknowledgement signal and said single acknowledgement signal are transmitted on a high speed dedicated physical transport channel.

19. The user equipment of claim 11, wherein said user equipment is configured to support at least one of: a multiple input-multiple output mode and a high speed downlink packet access.

20. The user equipment of claim 11, wherein at least one transmission timing interval of said downlink signal comprises said two transport blocks.

21. The user equipment of claim 11, wherein said power is two times the base power.

22. The user equipment of claim 11, wherein an integrated circuit comprises the uplink scheduling and signal generating module and the receiving/transmitting/processing module.

23. A communication system, comprising:
a network element, configured to provide a downlink signal comprising two transport blocks of information, configured to receive a dual acknowledgement signal for acknowledging said two transport blocks; and
a user equipment, configured to receive and further forward a downlink signal comprising said transport blocks of information, configured to provide said dual acknowledgement signal for acknowledging said two transport blocks, configured to define a power of said dual acknowledgement signal for acknowledging said two transport blocks according to a predetermined criterion, wherein said power has an offset relative to a base power of a single acknowledgement signal for acknowledging one transport block of information when received by said user equipment from said network element.

24. The communication system of claim 23, wherein said base power is an ACK power if, after being received, both said two transport blocks are successfully decoded by the user equipment, wherein said ACK power for said single acknowledgement signal corresponds to successfully decoding, when received, said one block by the user equipment.

25. The communication system of claim 23, wherein said base power is a NACK power if, after being received, one or two of said two transport blocks are unsuccessfully decoded by the user equipment, wherein said NACK power for said single acknowledgement signal corresponds to unsuccessfully decoding, when received, said one block by the user equipment.

26. A method, comprising:
sending two transport blocks of information by a network element to a user equipment;
defining by the network element a power of a dual acknowledgement signal for acknowledging said two transport blocks according to a predetermined criterion, wherein said power has an offset relative to a base power of a single acknowledgement signal for acknowledging one transport block of information when received by said user equipment from said network element; and
receiving by the network element said dual acknowledgement signal using said power sent by the user equipment.

27. The method of claim 26, wherein said network element is a Node B configured for wireless communications.

28. A computer program product comprising: a computer readable storage structure embodying computer program code thereon for execution by a computer processor with said computer program code, wherein said computer program code comprises instructions for performing the method of claim 26, indicated as being performed by a component or a combination of components of said network element or said user equipment.

29. A network element, comprising:
an uplink power and scheduling module, configured to provide a downlink signal comprising two transport blocks of information, configured to define a power of a dual acknowledgement signal for acknowledging said two transport blocks by a user equipment according to a predetermined criterion, wherein said power has an offset relative to a base power of a single acknowledgement signal for acknowledging one transport block of information when received by said user equipment from said network element; and
a receiver, configured to receive said dual acknowledgement signal for acknowledging said two transport blocks.

30. The network element of claim 29, further comprising:
a transmitter, configured to transmit a downlink signal comprising two transport blocks of information, and for transmitting a power instruction signal comprising said power offset to the user equipment.

31. A user equipment, comprising:
means for transmitting and receiving, for receiving from a network element and further forwarding a downlink signal comprising two transport blocks of information, for transmitting a dual acknowledgement signal for acknowledging said two transport blocks to the network element; and
means for signal managing, responsive to said two transport blocks of information comprised in said downlink signal, for defining a power of said dual acknowledgement signal for acknowledging said two transport blocks according to a predetermined criterion, wherein said power has an offset relative to a base power of a single acknowledgement signal for acknowledging one transport block of information when received by said user equipment from said network element.

32. The user equipment of claim 31, wherein said managing means is an uplink scheduling and signal generating module.

* * * * *